Nov. 24, 1959 F. G. STEELE 2,914,681

LOGICAL GATING NETWORK

Filed Jan. 31, 1955

INVENTOR,
FLOYD G. STEELE

BY

Seymour M. Rosenberg

ATTORNEY

United States Patent Office 2,914,681

Patented Nov. 24, 1959

2,914,681

LOGICAL GATING NETWORK

Floyd G. Steele, La Jolla, Calif., assignor to Digital Control Systems, Inc., La Jolla, Calif.

Application January 31, 1955, Serial No. 485,241

3 Claims. (Cl. 307—88.5)

Figure 1:
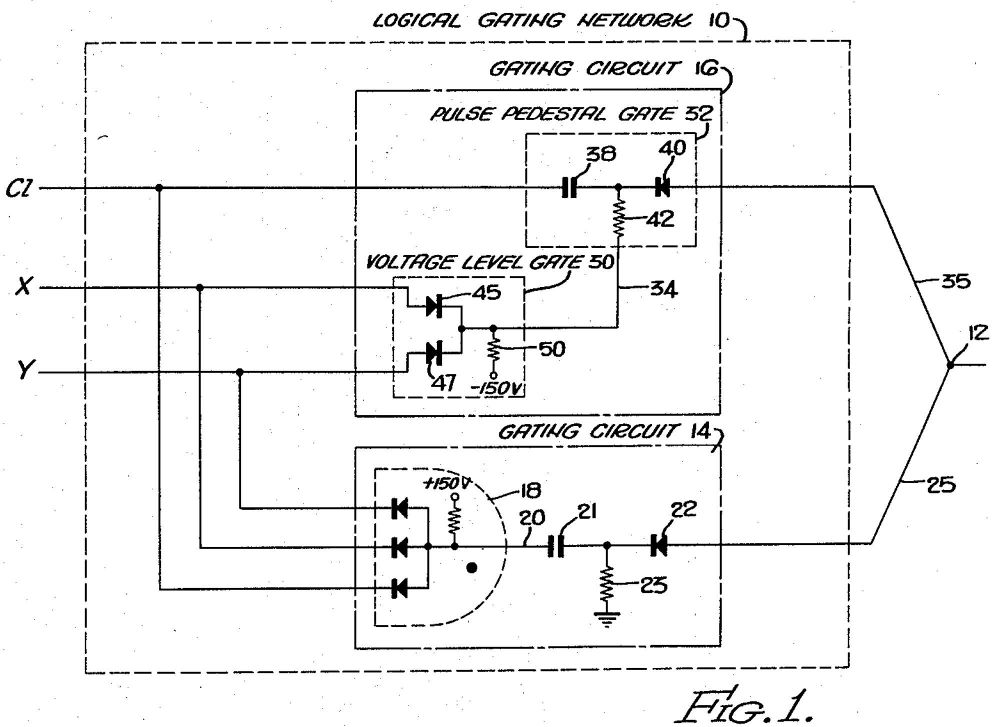

The present invention relates generally to electronic logical gating networks and more particularly to a passive element logical gating network element for use in the electronic switching and computing arts in passing an applied electrical pulse to an output terminal only when two applied bilevel electrical signals are both at the same level.

It has become general practice in the electronic switching and computing arts to utilize electronic flip-flop circuits or other types of two-state devices for storage and generation of binary information in the form of bilevel voltage signals. In many prior art circuits, each flip-flop has two separate input terminals to which pulses may be applied to respectively set the flip-flop to one or the other of its states. Each input terminal of a flip-flop will customarily have associated therewith a logical gating network responsive to bilevel input signals from a number of other flip-flops or other sources of bilevel signals for passing a periodically applied pulse signal to the associated input terminal of the flip-flop only when a predetermined logical relationship between the input signals is satisfied. Ordinarily, in their internal operation, such logical gating networks first generate a bilevel output signal which is at one of its levels when the predetermined relationship between the bilevel input signals is satisfied, and is at its other level when the predetermined relationship is not satisfied. The bilevel output signal which has been generated is then utilized to pass or not pass (block) the applied pulse signal to the associated flip-flop input terminal.

Logical gating networks of the described type are commonly constructed by combining elementary gating circuits such as "and" gates and "or" gates to mechanize the predetermined relationship assigned to the logical gating network. "And" gates and "or" gates and methods for combining them to mechanize arbitrary logical relationships are well known in the art and are described, for example, in an article entitled "An Algebraic Theory for Use in Digital Computer Design" by E. C. Nelson, published in the Transactions of the Professional Group on Electronic Computers of the Institute of Radio Engineers, September 1954 issue. Nelson's article also describes a widely used algebraic notation, termed logical algebra, which is particularly adapted for the description of logical gating circuits and networks.

In the prior art, logical gating networks have been constructed in accordance with the principles described by Nelson, for passing an applied pulse signal whenever two applied bilevel signals are at the same level. If the applied bilevel signals be designated X and Y respectively and the applied pulse signal is designated $Cl$, then a large family or grouping of prior art gating networks for accomplishing the desired gating function may be generally described by the following logical algebraic expression:

$$[(X.Y)+(\bar{X}.\bar{Y})].Cl \qquad (1)$$

where $\bar{X}$ and $\bar{Y}$ are signals which are complementary respectively to the applied bilevel signals X and Y and where:

(.) represents the logical "and" operation
(+) represents the logical "or" operation Expression 1 indicates that the described prior art gating networks require four bilevel input signals (X, Y, $\bar{X}$, $\bar{Y}$). In one specific widely used prior art gating network the signals X and Y are combined in an "and" gate to form a resultant signal $X.Y$ which is at a high level whenever signals X and Y are both high. The complementary signals $\bar{X}$ and $\bar{Y}$ are combined in a second "and" gate to form a resultant signal $\bar{X}.\bar{Y}$ which is high whenever signals $\bar{X}$ and $\bar{Y}$ are both high. The resultant signals $X.Y$ and $\bar{X}.\bar{Y}$ are combined in an "or" gate to form a bilevel output signal $X.Y+\bar{X}.\bar{Y}$ which is at a high level whenever signal $X.Y$ or signal $\bar{X}.\bar{Y}$ is at a high level. Finally the output signal $X.Y+\bar{X}.\bar{Y}$ is utilized in an "and" gate to control the passage of the applied pulse signal $Cl$, pulse signal $Cl$ being passed only if the output signal $X.Y+\bar{X}.\bar{Y}$ is high.

It can easily be shown that the described prior art gating network passes the pulse signal $Cl$ only when signals X and Y are both at the same level. Whenever, for example, signals X and Y are both at the same level, they must both be high or both low. If signals X and Y are both high, then resultant signal $X.Y$ will be high, while if signals X and Y are both low complementary signals $\bar{X}$ and $\bar{Y}$ will both be high and therefore resultant signal $\bar{X}.\bar{Y}$ will be high. In either event, whether signal $X.Y$ is high or signal $\bar{X}.\bar{Y}$ is high, the output signal $X.Y+\bar{X}.\bar{Y}$ will be high and will pass the applied pulse signal $Cl$. Thus pulse signal $Cl$ will be passed by the described prior are gating network whenever signals X and Y are at the same level (i.e. signals X and Y both high or both low).

The described prior art gating network has been widely used in the electronic switching arts. However, it has been recognized that there are several circumstances in which the use of this gating network is disadvantageous. For example if only signals X and Y are available as input signals, then in order to use this prior art gating network, it has been necessary to first obtain the complementary signals $\bar{X}$ and $\bar{Y}$ by utilizing active elements such as vacuum tube amplifiers to invert signals X and Y to produce the corresponding complementary signals $\bar{X}$ and $\bar{Y}$. The use of active element inversion stages adds to the cost of the logical gating network, greatly increases the power required by the network, and decreases the long term reliability of the network, since the useful "lifetime" of active elements, such as vacuum tubes, is usually far less than the "lifetime" of passive elements, such as crystal diode rectifiers, resistors, and condensers which are ordinarily used in the mechanization of logical gating networks.

Many electronic engineers therefore adopt the viewpoint that, in the mechanization of a gating network of the described type active element inversion stages will be used only as a last expedient when other available alternative mechanizations are equally disadvantageous. In one alternative prior art mechanization of the described gating network, the complementary signals $\bar{X}$ and $\bar{Y}$ are produced from primary flip-flop signals rather than by inversion of the complex signals X and Y.

For example, if it be assumed, for purposes of illustration that complex signal $X=A+B+C+D+E$, where A, B, C, D and E are primary output signals from five flip-flops, then, according to the principles of logical algebra:

$$\bar{X}=\bar{A}.\bar{B}.\bar{C}.\bar{D}.\bar{E} \qquad (2)$$

where $\bar{A}$, $\bar{B}$, $\bar{C}$, $\bar{D}$ and $\bar{E}$ are signals which are respectively complementary to the primary flip-flop signals A, B, C, D, E.

Expression 2 indicates that, for the assumed example, complementary signal $\bar{X}$ may be formed by combining the five complementary signals $\bar{A}$, $\bar{B}$, $\bar{C}$, $\bar{D}$, and $\bar{E}$ in a five input "and" gate to produce signal $\bar{X}$ as an output signal from the "and" gate. The complementary signals $\bar{A}$, $\bar{B}$, $\bar{C}$, $\bar{D}$, $\bar{E}$ will ordinarily be available, as primary flip-flop signals, from the same flip-flops which produced signals A, B, C, D, E, respectively.

It should be clear, in view of the foregoing example, that the production of complementary signal $\bar{X}$ from primary flip-flop signals will often require as much gating structure as was required for the generation of signal X. Especially in those circumstances where the generation of complex signal X from primary signals requires a large amount of gating structure, the use of an equivalent amount of gating structure for the generation of signal $\bar{X}$ from primary signals is very costly in terms both of expense and electronic complexity. Thus it is clear that, in many circumstances, a mechanization of the desired gating network embodying formation of complementary signals X and Y from primary flip-flop signals may be even more disadvantageous than an alternative mechanization utilizing active element inverter stages for the formation of the complementary signals.

The present invention, on the other hand, provides a logical gating network, for passing an applied pulse signal only when two applied bilevel control signals are at the same level, which overcomes the several disadvantages of the described prior art logical gating networks. The novel logical gating network of the present invention requires only the two applied bilevel signals as input signals thereto and does not require the corresponding complementary signals and therefore does not require the use of active element inverter stages or the formation of the complementary signals from primary flip-flop signals. In contrast to the prior art logical gating networks, the logical gating network of the present invention employs only passive elements and utilizes in its mechanization a relatively small number of simple and reliable components.

Using the symbols previously adopted, the logical gating network of the present invention requires only the two applied bilevel signals X and Y as input signals thereto and does not require the complementary signals $\bar{X}$ and $\bar{Y}$. The logical gating network employs only passive elements and directly combines the bilevel input signals X and Y, without inversion thereof, to pass the applied pulse signal *Cl* to the output terminal only when signals X and Y are at the same level.

According to the basic concept of the present invention, the novel passive element logical gating network comprises two passive element gating circuits, one gating circuit being responsive to signals X and Y for passing pulse signal *Cl* to an output terminal only when signals X and Y are both at one level and the second gating circuit being responsive to signals X and Y for passing pulse signal *Cl* to the output terminal only when signals X and Y are both at their other level.

In one specific embodiment of the present invention the first gating circuit may comprise an "and" gate which passes the pulse signal *Cl* to the output terminal only when X and Y are both high, while the second gating circuit may include a voltage level "or" gate and a pulse pedestal gate, the "or" gate being responsive to signals X and Y for producing an output control signal which is low whenever signals X and Y are both low, and the pulse pedestal gate being controlled by the output control signal from the voltage level "or" gate for passing the applied pulse control signal *Cl* to the output terminal whenever this output signal is low. Thus in the above-described specific embodiment of the logical gating network of the present invention, the second passive element gating circuit functions to pass the pulse signal *Cl* only when signals X and Y are both low, while the first passive element gating circuit functions to pass the applied pulse signal *Cl* only when signals X and Y are both high.

In a preferred embodiment of the present invention the "and" gate and the "or" gate are mechanized in conventional fashion with diode rectifiers, the output control signal from the "or" gate being applied through an impedance to one electrode of a diode rectifier contained in the pulse pedestal gate, to thereby bias the diode to either pass or block pulse signal *Cl* in accordance with the level of the control signal. In one preferred form of this circuit arrangement, the pulse pedestal gate and the "or" gate share a resistive impedance, this impedance serving both as an integral portion of the "or" gate and also serving as a voltage dividing impedance for applying the "or" gate output signal to the pulse pedestal gate to control the operation of the pulse pedestal gate.

It is, therefore, an object of the present invention to provide an inexpensive and reliable passive element logical gating network responsive to two applied bilevel signals X and Y for passing an applied pulse signal *Cl* to an output terminal only when signals X and Y are both at the same level.

It is another object of the invention to provide a passive element gating network comprising a first gating circuit for passing an applied pulse signal *Cl* to an output terminal only when two applied bilevel signals X and Y are at one of their levels and a second gating circuit for passing signal *Cl* to the output terminal whenever signals X and Y are both at their other level.

It is still another object of the present invention to provide an inexpensive and reliable passive element logical gating network for detecting equality between the levels of two applied bilevel signals, which does not utilize signals which are complementary to the two bilevel signals and which therefore does not require the use of inverter stages or the formation of the complementary signals from primary signals.

It is yet another object of the present invention to provide a gating circuit for passing an applied pulse signal *Cl* to an output terminal only when two applied bilevel signals X and Y are both at a low level, said gating circuit comprising a diode "or" gate for producing a control signal which is at a low level whenever signals X and Y are both low, and pulse pedestal gate receiving the control signal and passing pulse signal *Cl* to the output terminal only when the control signal is low.

The novel features which are believed to be characteristic of the invention both as to its organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only, and are not intended as a definition of the limits of the invention.

Figure 2:
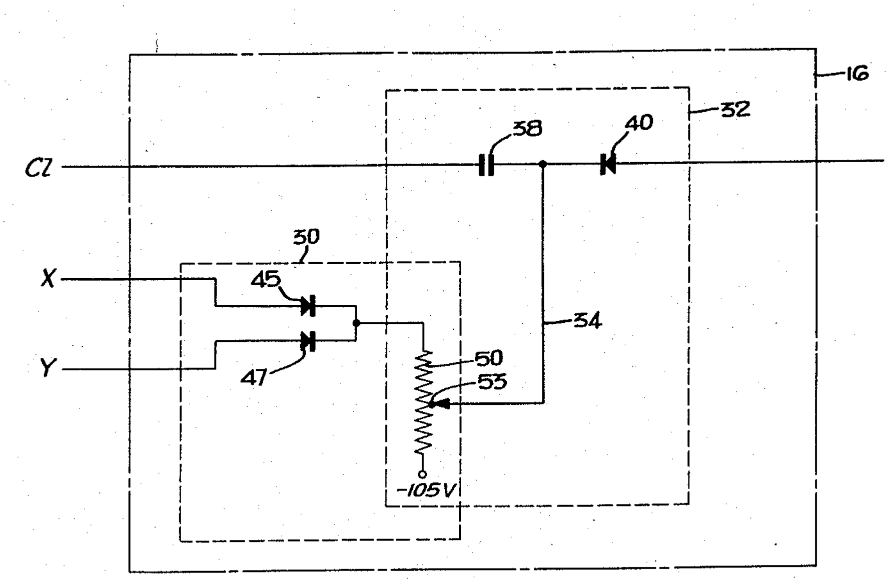

Fig. 1 is a combined block diagram and circuit diagram, of a preferred embodiment of the present invention; and Fig. 2 is a circuit diagram illustrating a modification of the circuitry of a logical gating circuit shown in Fig. 1.

Referring now to the drawings wherein like reference characters represent like or corresponding parts throughout the several views, there is shown in Fig. 1 a preferred embodiment of a logical gating network 10, according to the present invention, for passing an applied pulse signal *Cl* to an output terminal 12 only when two applied bilevel signals X and Y are both at the same level. Basically, logical gating network 10 comprises two logical gating circuits 14 and 16. Gating circuit 14 is responsive to the bilevel signals X and Y and to the pulse signal *Cl* for passing pulse signal *Cl* to output terminal 12 only when bilevel signals X and Y are both at their high levels. Gating circuit 16 is responsive to bilevel signals X and Y and pulse signal *Cl* for passing pulse signal *Cl* to output terminal 12 only when bilevel signals X and Y are both at their low levels. Thus, it is clear that in overall operation logical gating network 10 functions to pass pulse signal *Cl* to output terminal 12 only when bilevel signals X and Y are at the same level, for whether input signals X and Y are both high or both low, one or the other, respectively of gating circuits 14 and 16 will function to pass pulse signal *Cl* to output terminal 12.

Gating circuit 14 is entirely conventional in structure and includes a voltage level "and" gate 18 which receives input signals X, Y and *Cl* and applies to an output conductor 20 a resultant signal which is at a high level only when input signals X, Y and *Cl* are all at their high level and at a low level whenever any one of the input signals, X, Y and *Cl* is at its low level. Output conductor 20 is connected to a terminal of a capacitor 21, the other terminal of capacitor 21 being connected to the cathode of a diode rectifier 22 and to one end of a resistor 23 whose other end is connected to a source of potential at the ground or zero level. The anode of diode 22 is connected by an output conductor 25 to output terminal 12.

In describing the operation of gating circuit 14 it will be assumed for purposes of example that the D.C. voltage level normally existing at output terminal 12 is approximately at the ground level. It will also be assumed that the pulse signal *Cl* is normally at a high voltage level (corresponding to the high voltage level of signals X and Y) and that during an applied pulse signal the voltage level of signal *Cl* descends momentarily, during the pulse, to a relatively low level (corresponding to the low levels of signals X and Y). For example, if it be assumed that signals X and Y have voltage levels varying between +8 volts (high) or 0 volts (low), then signal *Cl* would normally be at +8 volts and would descend during a pulse to a value of approximately 0 volts. The described voltage levels are assumed only for purposes of illustration and it will become clear from the following description that these voltage levels can be widely varied without affecting the basic operation of the invention.

Continuing the description of the operation of gating circuit 14, those skilled in the art will recognize that capacitor 21 will block the steady state D.C. voltage levels prevailing on output conductor 20 and will transmit to the cathode of diode 22 only pulse signals corresponding to a change of voltage level on output conductor 20. If at the time of application of negative pulse signal *Cl*, the voltage on output conductor 20 is already low as when signal X or Y is low, then the application of signal *Cl* will not cause any change in the voltage level on conductor 20, and therefore pulse signal *Cl* will not be transmitted to diode 22. However, if at the time of application of negative pulse signal *Cl*, the voltage on output conductor 20 is high, as when signals X and Y are both high, then the application of pulse signal *Cl* will cause the voltage level on conductor 20 to drop from its high level to its low level, during the pulse, and accordingly the pulse signal *Cl* will be transmitted to the cathode of diode 22. It is therefore evident that negative pulse signal *Cl* will only be transmitted to the cathode of diode rectifier 22 when signals X and Y are both high. Diode rectifier 22 is provided for blocking undesired positive pulse signals. Any negative pulse signal *Cl* transmitted to diode 22 will be passed by the diode to output terminal 12, since the application of a negative signal at the cathode of diode 22 tends to bias the diode in its forward current direction causing the diode to strongly conduct the applied negative signal.

Referring next to logical gating circuit 16, as shown in Fig. 1, the gating circuit is seen to comprise two passive element gates, a voltage level "or" gate 30 and a pulse pedestal gate 32. Voltage level gate 30 is responsive to signals X and Y for producing a control signal which is at the high level whenever signal X or Y is at a high level. Conversely, therefore, the control signal produced by "or" gate 30 will be at a low level only when signals X and Y are both at the low level. The control signal produced by "or" gate 30 is applied over a conductor 34 to pulse pedestal gate 32 which is responsive to negative pulse signal *Cl* and the control signal for passing signal *Cl* to output terminal 12 over an output conductor 35 only when the control signal is at the low level.

Describing now the structure of pulse pedestal gate 32, as shown in Fig. 1, the pulse signal *Cl* is applied to one terminal of a capacitor 38, the other terminal of the capacitor being connected to the cathode of a diode rectifier 40 and to one end of a resistor 42 whose other end is connected to output conductor 34. The anode of diode 40 is connected to output terminal 12 by conductor 35. Describing next the structure of voltage level gate 30, as shown in Fig. 1, signals X and Y are applied to the anodes of two diode rectifiers 45 and 47, respectively, whose cathodes are connected in common to output conductor 34. A resistor 50 is intercoupled between output conductor 34 and a source of negative voltage, not shown.

Considering now the operation of gating circuit 16 and referring first to the operation of voltage level "or" gate 30, if either of the signals X or Y is at its high level the corresponding diode rectifier 45 or 47 will be biased in its forward current direction and will therefor conduct strongly to thereby maintain the voltage level on output conductor 34 very close to the high level of the applied signal. Thus the voltage level on output conductor 34 will only be at the low level if input signals X and Y are both at the low level.

As shown in Fig. 1, within pulse pedestal gate 32, the control signal applied over output conductor 34 is coupled through a resistor 42 to the cathode of diode rectifier 40 to thereby bias said rectifier so as to pass the pulse signal *Cl* when signal *Cl* is at the low level and to block the pulse signal *Cl* when the control signal is at the high level. For example, let it be assumed as was done hereinbefore that the normal voltage level at output terminal 12 is 0 volts and that signals X and Y vary between +8 volts (at their high levels) and 0 volts (at their low levels), while signal *Cl* during a pulse makes a negative voltage excursion of 8 volts. Then if either of the signals X or Y is at its high level (+8 volts) the output voltage level of the control signal produced by gate 30 will also be at its high level, approximately +8 volts. The voltage level at the cathode of diode rectifier 40 within pulse pedestal gate 32 will then rise to +8 volts also and will thereby back bias diode rectifier 40 so as to render it nonconductive. If now pulse signal *Cl* is applied, it will be blocked by diode rectifier 40, since the application of pulse signal *Cl* will only lower the voltage at the cathode of diode rectifier 40 from +8 volts to 0 volts and thus rectifier 40 will never become conductive so as to pass the pulse.

However, if on the other hand, signals X and Y are both at their low levels (0 volts), the voltage level at the cathode of diode 40 will also be at 0 volts and the diode instead of being far back-biased will be on the verge of entering its conductive region and any negative voltage excursion at this point will render the diode strongly conductive. Thus when a pulse signal *Cl* is applied, producing an 8 volt negative voltage excursion at this point, diode rectifier 40 will become strongly conductive and the whole of the 8 volt negative pulse will be transmitted or passed over output conductor 35 to output terminal 12. Thus in overall operation it is clear that gating circuit 16 functions to pass the applied pulse signal *Cl* only when voltage level signals X and Y are both at their low levels.

According to the basic principles of the invention the operation of gating circuit 16 may be modified for adaptation to a wide range of voltage levels of input signals X and Y. If, for example, it were assumed that signals X and Y varied between levels of +30 and +20 volts and that therefore the control voltage applied over conductor 34 varied between the same levels, the only modification required, to adapt the circuit at this range of levels of applied input signals, would be to provide a voltage divider to reduce the levels of the control signal to values appropriate for the operation of the pulse pedestal gate. Thus it is clear that the basic operation of gating circuit 16 is independent of the particular voltage levels which are maintained by the input signals, the only real requirement being that bilevel signals be used.

Referring to Fig. 2 there is shown an alternative embodiment of gating circuit 16 which includes a modified circuit arrangement of the type which has just been described. In connection with the embodiment of gating circuit 16 shown in Fig. 2, it is assumed that the voltage levels of signals X and Y are too high for direct application to the cathode of diode rectifier 40 of pulse pedestal gate 32. Therefore, to reduce the voltage level of the control signal produced by "or" gate 30 the resistor 50 which is normally contained in the "or" gate is itself utilized as a voltage divider. Thus in the embodiment of circuit 16 shown in Fig. 2 a central tap point 53 has been selected on resistor 50 at which the voltage level of the control signal is suitable for application to the pulse pedestal gate 34. Tap point 53 is then directly connected by output conductor 34 to the cathode of diode rectifier 40 to apply the modified control voltage to said cathode.

The operation of pulse pedestal gate 32 is then exactly the same as was hereinbefore described in connection with Fig. 1. However, resistor 50 now serves a dual purpose and is shared by gates 30 and 32, resistor 50 serving as a pull-down resistor for gate 30 and also serving as an impedance for applying a modified control signal to the cathode of diode rectifier 40.

Summarizing now the overall operation of logical gating network 10, it has been demonstrated that gating circuit 14 functions to pass the applied pulse signal *Cl* only when signals X and Y are at their high levels and that gating circuit 16 functions to pass the applied pulse signal *Cl* only when signals X and Y are both at their low levels. It is therefore evident that logical gating network 10 is responsive to signals X and Y for passing an applied pulse signal *Cl* to output terminal 12 only when signals X and Y are both at the same level.

As shown in Figs. 1 and 2, only passive elements which are both inexpensive and highly reliable are used in the mechanization of gating network 10. Gating network 10, according to the invention, operates directly upon the applied bilevel signals X and Y and does not require any additional input signals nor does it perform any inversion of the voltage levels of signals X and Y.

It should be understood, of course, that the foregoing discussion relates only to the preferred embodiments of the invention and that numerous modifications or alterations may be made therein. For example, although it has been assumed, for purposes of demonstration, that the normal voltage level at output terminal 12 was in the neighborhood of 0 volts, it is obvious to one skilled in the art that logical gating network 10 may be readily modified for operation with any value of voltage obtaining at output terminal 12. For example, if the normal voltage level at output terminal 12 were −25 volts, resistor 23 as shown in Fig. 1 would merely be returned to a source of −25 volts rather than to ground, and the overall operation of gating circuit 14 would remain unaffected. Gating circuit 16 could be similarly adapted. A form of gating circuit 16 similar to that shown in Fig. 2 might be used, with the position of the tap point 53 on resistor 50 being adjusted to provide a control voltage suitable for the operation of pulse pedestal gate 32 when a voltage of −25 volts is continuously applied to the anode of diode 40 of gate 32.

It is therefore clear that one skilled in the art could make numerous modifications and alterations of the disclosed logical gating network without thereby departing from the spirit and scope of the invention as set forth in the appended claims.

What is claimed as new is:

1. A passive element logical gating network for passing an applied electrical pulse signal *Cl* having a predetermined polarity to an output terminal only when two applied bilevel electrical signals X and Y, each applied at either a relatively positive or relatively negative level, are both at the same level, said logical gating network comprising: a first passive element gating circuit means coupled to the output terminal and responsive to signals X and Y and pulse signal *Cl* for passing signal *Cl* to the output terminal only when signals X and Y are both at one level opposite to the polarity of pulse signal, *Cl*; and a second passive element gating circuit means coupled to the output terminal, and responsive to signals X, Y and *Cl* for passing signal *Cl* to the output terminal only when signals X and Y are both at the other level corresponding to the polarity of pulse signal *Cl*, said second gating circuit means comprising a first passive element voltage level gate means responsive to signals X and Y for producing a control signal which is at the other level only when signals X and Y are both at said other level; and a second passive element gate means responsive to signal *Cl* and the control signal for passing signal *Cl* to the output terminal only when the control signal is at said other level, said second passive element gate means including a diode rectifier having first and second electrodes, said first electrode being coupled to the output terminal, capacitative coupling means for applying the pulse signal *Cl* to the second electrode of said diode rectifier, and impedance means for applying the control signal to the second electrode to thereby bias said diode to either pass or block the pulse signal *Cl* in accordance with the level of the control signal.

2. The gating network defined by claim 1 wherein said first voltage level gate means comprises a diode gate responsive to the bilevel signals X and Y for producing a control signal which is at a relatively negative level whenever signals X and Y are both at a relatively negative level and wherein said second passive element gate means is responsive to the control signal and to the pulse signal *Cl* for passing signal *Cl* to the output terminal only when the control signal is at the low level.

3. In a passive element logical gating network, a gating circuit for passing a negative pulse *Cl* to an output terminal only when two applied voltage level signals are both at a low level, said gating circuit comprising: a first voltage level gate means responsive to signals X and Y for producing a control signal which is at the low level only when signals X and Y are both at the low level and a second gate means responsive to negative pulse signal *Cl* and said control signal for passing signal *Cl* to the output terminal only when the control signal is at the low level, said second gate means including a diode rectifier having a cathode and an anode, said anode being coupled to the output terminal, a condenser for applying the negative pulse signal *Cl* to the cathode of said diode rectifier and an impedance means for applying the control signal to the cathode of said diode rectifier to thereby bias said diode rectifier to pass the negative pulse *Cl* when the control signal is at the low level and to block the negative pulse *Cl* when the control signal is at the high level.

References Cited in the file of this patent

UNITED STATES PATENTS

| | | |
|---|---|---|
| 2,693,907 | Tootill | Nov. 9, 1954 |
| 2,765,115 | Beloungie | Oct. 2, 1956 |
| 2,773,982 | Trousdale | Dec. 11, 1956 |
| 2,787,707 | Cockburn | Apr. 2, 1957 |